(12) United States Patent
Freeman et al.

(10) Patent No.: US 11,732,598 B2
(45) Date of Patent: Aug. 22, 2023

(54) CERAMIC MATRIX COMPOSITE TURBINE SHROUD SHAPED FOR MINIMIZING ABRADABLE COATING LAYER

(71) Applicants: Rolls-Royce Corporation, Indianapolis, IN (US); Rolls-Royce High Temperature Composites Inc., Cypress, CA (US)

(72) Inventors: Ted J. Freeman, Danville, IN (US); Jeremy Roehm, Plainfield, IN (US)

(73) Assignees: Rolls-Royce Corporation, Indianapolis, IN (US); Rollos-Royce High Temperature Composites Inc., Cypress, CA (US)

( * ) Notice: Subject to any disclaimer, the term of this patent is extended or adjusted under 35 U.S.C. 154(b) by 0 days.

(21) Appl. No.: 17/554,819

(22) Filed: Dec. 17, 2021

(65) Prior Publication Data

US 2023/0193775 A1     Jun. 22, 2023

(51) Int. Cl.
| | |
|---|---|
| *F01D 11/12* | (2006.01) |
| *F01D 25/00* | (2006.01) |
| *F01D 25/28* | (2006.01) |
| *F01D 25/24* | (2006.01) |

(52) U.S. Cl.
CPC .......... *F01D 11/122* (2013.01); *F01D 25/005* (2013.01); *F01D 25/24* (2013.01); *F01D 25/28* (2013.01); F05D 2240/11 (2013.01); F05D 2250/75 (2013.01); F05D 2260/30 (2013.01); F05D 2300/6033 (2013.01); F05D 2300/6111 (2013.01)

(58) Field of Classification Search
CPC ...... F01D 11/122; F01D 25/005; F01D 25/24; F05D 2240/11; F05D 2250/75; F05D 2260/30; F05D 2300/6033
See application file for complete search history.

(56) References Cited

U.S. PATENT DOCUMENTS

| | | | |
|---|---|---|---|
| 5,439,349 A | 8/1995 | Hughes et al. | |
| 5,683,789 A | 11/1997 | Langenbrunner et al. | |
| 6,358,002 B1 * | 3/2002 | Good | F01D 11/122 |
| | | | 415/174.4 |
| 9,546,562 B2 * | 1/2017 | Hillier | F01D 11/122 |
| 9,759,082 B2 * | 9/2017 | Thomas | F01D 11/18 |
| 10,047,624 B2 * | 8/2018 | O'Leary | F01D 25/005 |
| 10,077,670 B2 * | 9/2018 | McCaffrey | F01D 11/08 |
| 10,196,918 B2 * | 2/2019 | McCaffrey | F01D 25/28 |
| 10,267,174 B2 | 4/2019 | Liu et al. | |
| 10,323,533 B2 | 6/2019 | Hitchman et al. | |
| 10,414,142 B2 * | 9/2019 | Chamberlain | B29C 66/0242 |
| 10,808,565 B2 | 10/2020 | Walston et al. | |
| 10,858,950 B2 | 12/2020 | Shi et al. | |
| 10,900,371 B2 * | 1/2021 | Shi | F01D 11/122 |
| 10,994,304 B2 | 5/2021 | Takahashi et al. | |
| 11,085,317 B2 * | 8/2021 | Johnson | F01D 9/04 |
| 11,187,100 B2 * | 11/2021 | Barker | F01D 11/122 |

(Continued)

*Primary Examiner* — Brian P Wolcott
(74) *Attorney, Agent, or Firm* — Barnes & Thornburg LLP (57) ABSTRACT

A turbine shroud segment for use in a gas turbine engine includes a ceramic shroud segment formed to define a circumferentially extending channel that opens radially inwardly and a layer of abradable material that extends axially along a radial inner surface of the ceramic shroud segment to provide a flow path surface of the turbine shroud segment.

23 Claims, 8 Drawing Sheets

(56) References Cited

U.S. PATENT DOCUMENTS

| | | | |
|---|---|---|---|
| 11,286,802 B2* | 3/2022 | Vetters | F01D 25/246 |
| 2011/0217166 A1* | 9/2011 | McMillan | F01D 25/162 |
| | | | 428/137 |
| 2016/0305319 A1 | 10/2016 | Baldiga et al. | |
| 2017/0175572 A1* | 6/2017 | Vetters | F01D 25/12 |

* cited by examiner

CERAMIC MATRIX COMPOSITE TURBINE SHROUD SHAPED FOR MINIMIZING ABRADABLE COATING LAYER

FIELD OF THE DISCLOSURE

The present disclosure relates generally to gas turbine engines, and more specifically to turbine shroud assemblies adapted for use with gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies. Such static shrouds may be coupled to an engine case that surrounds the compressor, the combustor, and the turbine.

Some shrouds positioned in the turbine may be exposed to high temperatures from products of the combustion reaction in the combustor. Such shrouds sometimes include components made from ceramic materials with a layer of abradable material. It may be desirable to have the benefits of a ceramic shroud while minimizing an amount of material used for the abradable layer.

SUMMARY

The present disclosure may comprise one or more of the following features and combinations thereof.

According to an illustrative aspect of the present disclosure, a turbine shroud segment for use in a gas turbine engine includes a ceramic matrix composite shroud and a layer of abradable material. The ceramic matrix composite shroud segment includes an L-shaped first ceramic sub-laminate, an L-shaped second ceramic sub-laminate, a U-shaped third ceramic sub-laminate, and a fourth ceramic sub-laminate.

The L-shaped first ceramic sub-laminate extends axially aft and turns to extend radially outward relative to an axis. The L-shaped second ceramic sub-laminate extends axially forward and turns and extends radially outward. The second ceramic sub-laminate spaced apart axially from the first ceramic sub-laminate. The U-shaped third ceramic sub-laminate is located axially between the first ceramic sub-laminate and the second ceramic sub-laminate. The third ceramic sub-laminate cooperates with the first ceramic sub-laminate and the second ceramic sub-laminate to define a radially extending first attachment post and a radially extending second attachment post of the turbine shroud segment. The first attachment post spaced apart axially from the second attachment post.

The fourth ceramic sub-laminate extends axially along the first ceramic sub-laminate, the second ceramic sub-laminate, and the third ceramic sub-laminate. The fourth ceramic sub-laminate is shaped to define a circumferentially extending channel that opens radially inwardly. The channel is spaced apart axially from axial ends of the fourth ceramic sub-laminate.

The layer of abradable material extends axially and is located radially inward of a radial inner surface of the ceramic matrix composite shroud segment to provide a flow path surface of the turbine shroud segment. The layer of abradable material extending axially forward of the channel, filling the channel, and extending axially aft of the channel.

In some embodiments, the first ceramic sub-laminate, the second ceramic sub-laminate, and the third ceramic sub-laminate each include a same number of ceramic plies. In some embodiments, the third ceramic sub-laminate has a different number of ceramic plies from the first ceramic sub-laminate and the second ceramic sub-laminate.

In some embodiments, the ceramic matrix composite shroud segment further includes a first deltoid engaged with the first ceramic sub-laminate, the third ceramic sub-laminate, and the fourth ceramic sub-laminate. The first deltoid includes a radially outward extending tip. The first deltoid is tilted such that the tip extends at an angle relative to a ray extending from the axis.

In some embodiments, the fourth ceramic sub-laminate tapers radially outward aft of the channel to cause the flow path surface to angle radially outward. In some embodiments, the fourth ceramic sub-laminate includes a radially inner most first layer that extends continuously between the axial ends of the fourth ceramic sub-laminate, a second layer directly engaged with the first layer and extending only partway axially between a first of the axial ends and the channel, and a third layer directly engaged with the second layer and extending continuously between the axial ends of the fourth ceramic sub-laminate.

In some embodiments, the first attachment post extends radially outward in a straight path and terminates at a free end that is spaced apart radially from the fourth ceramic sub-laminate. In some embodiments, the first attachment post is formed to define a through hole that extends axially through the first attachment post.

In some embodiments, the turbine shroud segment further includes a bond coat layer and an environmental barrier coating layer located radially between the fourth ceramic sub-laminate and the layer of abradable material. In some embodiments, the fourth ceramic sub-laminate is formed from a plurality of ceramic plies and each of the plurality of ceramic plies included in the fourth ceramic sub-laminate extends continuously and entirely axially between the axial ends of the fourth ceramic sub-laminate.

According to another illustrative aspect of the disclosure, a turbine shroud segment includes a ceramic shroud segment and a layer of abradable material. The ceramic shroud segment includes a first ceramic sub-laminate, a second ceramic sub-laminate, a third ceramic sub-laminate, and a fourth ceramic sub-laminate.

The first ceramic sub-laminate includes an axially extending first segment and radially extending second segment. The second ceramic sub-laminate that includes an axially extending first segment and radially extending second segment. The third ceramic sub-laminate is located axially between the first ceramic sub-laminate and the second ceramic sub-laminate. The third ceramic sub-laminate includes an axially extending first segment, a radially extending second segment that extends along the radially extending second segment of the first ceramic sub-laminate to define a first attachment post, and a radially extending third segment that extends along the radially extending second segment of the second ceramic-sub laminate to define a second attachment post.

The fourth ceramic sub-laminate extends axially along the first ceramic sub-laminate, the second ceramic sub-laminate, and the third ceramic sub-laminate. The fourth ceramic sub-laminate is shaped to define a circumferentially extending channel that opens radially inwardly and the channel is spaced apart axially from axial ends of the fourth ceramic sub-laminate. The layer of abradable material extends axially and is located radially inward of a radial inner surface of the ceramic shroud segment to provide a flow path surface of the turbine shroud segment, the layer of abradable material extending forward of the channel, filling the channel, and extending aft of the channel.

In some embodiments, the first ceramic sub-laminate, the second ceramic sub-laminate, and the third ceramic sub-laminate each include a same number of ceramic plies. In some embodiments, the third ceramic sub-laminate has a different number of ceramic plies from the first ceramic sub-laminate and the second ceramic sub-laminate.

In some embodiments, the fourth ceramic sub-laminate tapers radially outward aft of the channel to cause the flow path surface to angle radially outward. In some embodiments, the fourth ceramic sub-laminate includes a radially inner most first layer that extends continuously between the axial ends of the fourth ceramic sub-laminate, a second layer directly engaged with the first layer and extending only partway axially between a first of the axial ends and the channel, and a third layer directly engaged with the second layer and extending continuously between the axial ends of the fourth ceramic sub-laminate.

In some embodiments, the ceramic shroud segment further includes a first deltoid engaged with the first ceramic sub-laminate, the third ceramic sub-laminate, and the fourth ceramic sub-laminate. The first deltoid includes a radially outward extending tip and tilted such that the tip extends at an angle relative to a ray extending from the axis. The second deltoid is engaged with the second ceramic sub-laminate, the third ceramic sub-laminate, and the fourth ceramic sub-laminate. The second deltoid includes a radially outward extending tip and tilted such that the tip extends at an angle relative to a second ray extending from the axis.

In some embodiments, the fourth ceramic sub-laminate is formed from a plurality of ceramic plies. Each of the plurality of ceramic plies included in the fourth ceramic sub-laminate extends continuously and entirely axially between the axial ends of the fourth ceramic sub-laminate.

According to another aspect of the disclosure includes a method. The method may include positioning an L-shaped first ceramic sub-laminate axially apart from an L-shaped second ceramic sub-laminate relative to an axis, positioning a U-shaped third ceramic sub-laminate axially between the first ceramic sub-laminate and the second ceramic sub-laminate, positioning a fourth ceramic sub-laminate along a radial inner side of the first, second, and third ceramic sub-laminates to provide a shroud segment preform, the fourth ceramic sub-laminate formed to define a radially inwardly opening channel, infiltrating the shroud segment preform to provide a ceramic turbine shroud, and applying a layer of abradable material along a radial inner surface of the ceramic turbine shroud such that the layer of abradable material is located forward of the channel, fills the channel, and aft of the channel so as to form a continuous flow path surface.

In some embodiments, the method includes forming the fourth ceramic sub-laminate by providing a first ply, applying a second ply directly onto the first ply, and applying a third ply directly to the second ply, the first ply forming the radial innermost surface of the ceramic turbine shroud and extending completely between a first axial end and a second axial end of the ceramic turbine shroud, the second ply extending only partway axially from the first axial end toward the second axial end, and the third ply extending axially completely between the first axial end and the second axial end. In some embodiments, the method includes forming the fourth ceramic sub-laminate by applying a plurality of plies onto one another and bending the fourth ceramic sub-laminate to define the channel.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

A turbine shroud segment 10 adapted for use in a gas turbine engine 110 is shown in FIGS. 1-4. The turbine shroud segment 10 is configured to define a flow path 122 boundary of the gas turbine engine 110.

Figure 4:
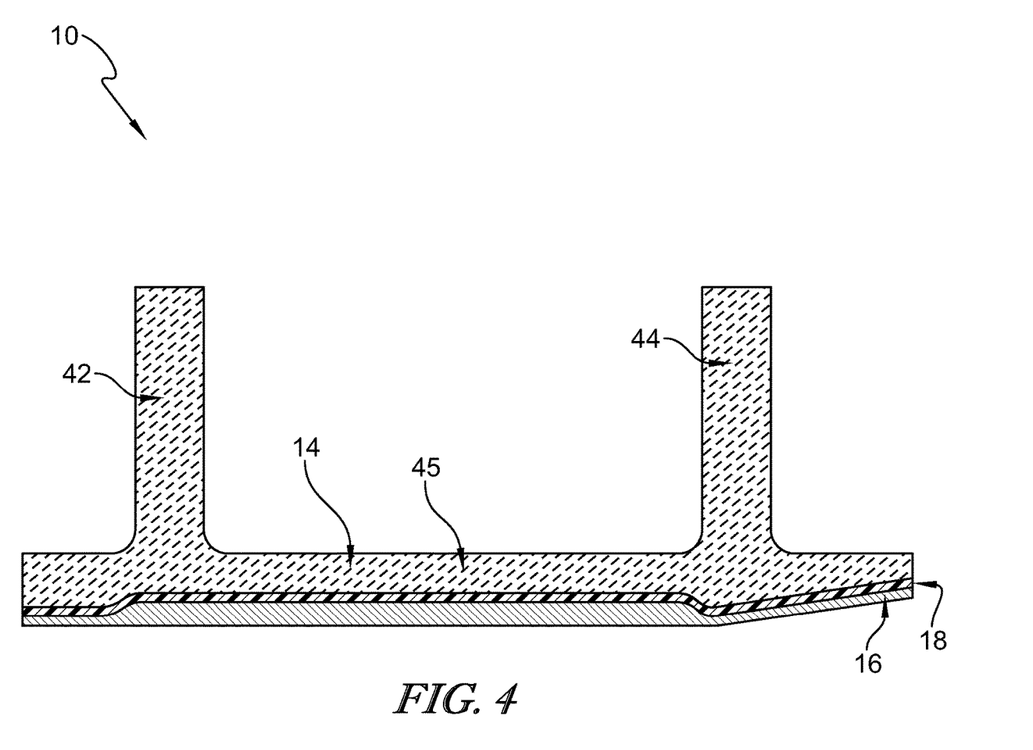
FIG. 4 is a cross-section view of the turbine shroud segment of FIG. 3 taken along line 4-4 showing that the turbine shroud segment includes a ceramic shroud segment and a layer of abradable material extending axially along a radial inner surface of the ceramic shroud segment and into a channel formed in the ceramic shroud segment.

The turbine shroud segment 10 of the present disclosure includes a ceramic shroud segment 14 and a layer of abradable material 16 as shown in FIG. 4. The ceramic shroud segment 14 is shaped to define a circumferentially extending channel 50. The layer of abradable material 16 extends axially along a radial inner surface 48 of the ceramic shroud segment 14 forward of the channel 50, filling the channel 50, and extending aft of the channel 50 to provide a flow path surface 36 of the turbine shroud segment 10 and define the flow path 122 boundary. In alternative embodiments, the ceramic shroud segment 14 is cured as a ceramic matrix composite shroud segment. Illustratively, the turbine shroud segment 10 further includes a layer 18 located radially between the ceramic shroud segment 14 and the layer of abradable material 16. The layer 18 may comprise bonding and/or environmental barrier coating material. In the illustrative embodiment, the layer 18 includes a bonding coat layer and an environmental barrier coating layer radially inward of the bonding coat layer.

Referring again to FIG. 1, the turbine shroud segment 10 is part of engine 110 which includes a fan assembly 112, a compressor 114, a combustor 116, and a turbine 118. The fan assembly 112 is driven by the turbine 118 and provides thrust for propelling an aircraft coupled with the engine 110. The compressor 114 compresses and delivers air to the combustor 116. The combustor 116 then mixes fuel with the compressed air and ignites the fuel. The hot, high-pressure products of the combustion reaction in the combustor 116 are directed into the turbine 118 to cause the turbine 118 to rotate about a central axis 11 and drive the compressor 114 and the fan assembly 112.

Figure 1:
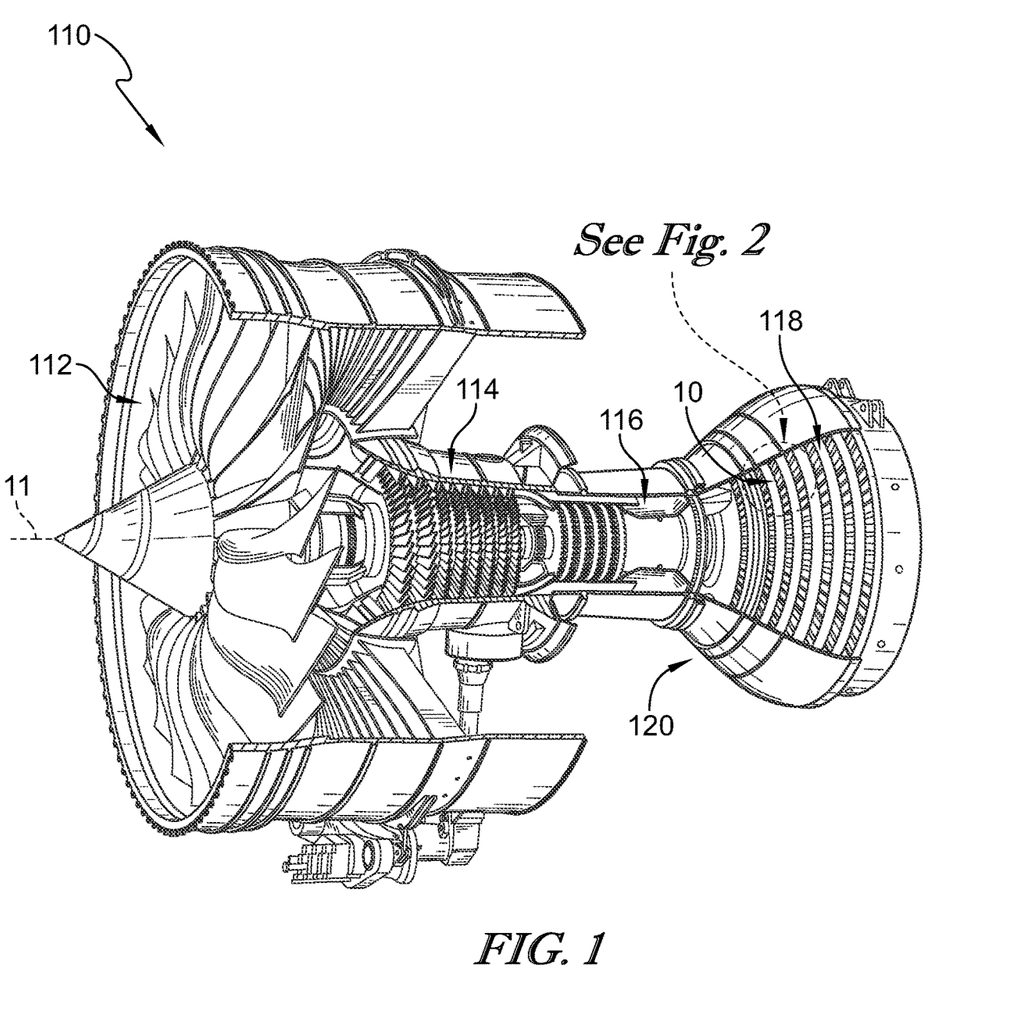
FIG. 1 is a cutaway view of a gas turbine engine that includes a fan assembly and an engine core having a compressor, a combustor, and a turbine, the turbine including rotating wheel assemblies configured to rotate about an axis of the engine and static turbine vane rings configured to direct air into downstream rotating wheel assemblies.
Figure 2:
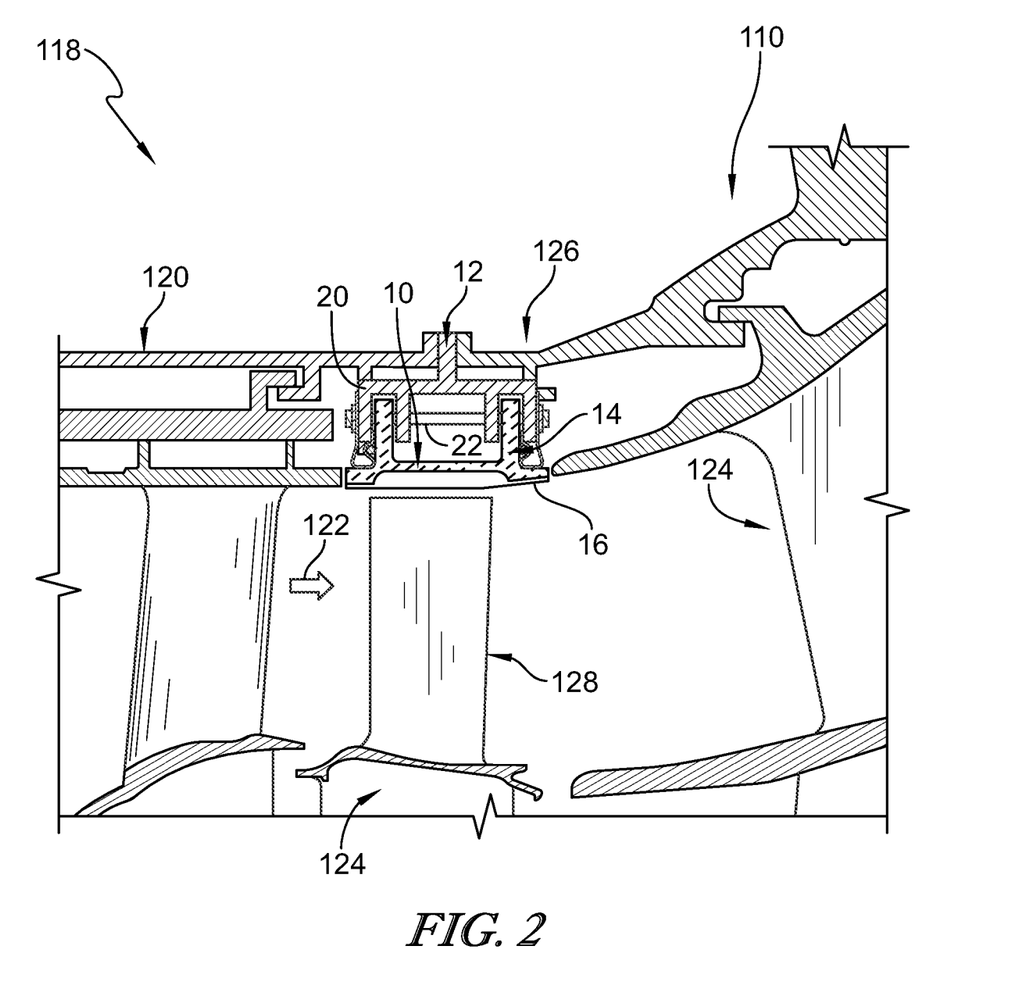
FIG. 2 is a section view of a portion of the gas turbine engine of FIG. 1 showing the turbine further includes a turbine shroud assembly positioned radially outward from blades of one of the rotating wheel assemblies, the turbine shroud assembly including a turbine shroud segment in accordance with the present disclosure that defines a portion of a flow path of the gas turbine engine.

The turbine 118 includes at least one turbine wheel assembly 124 and a turbine shroud assembly 126 positioned to surround the turbine wheel assembly 124 as shown in FIGS. 1 and 2. The turbine shroud assembly 126 is coupled to a turbine case 120 of the gas turbine engine 110. The turbine wheel assembly includes a plurality of blades 128 coupled to a rotor disk for rotation therewith. The hot, high pressure combustion products from the combustor 116 are directed toward the blades 128 of the turbine wheel assemblies 124. The blades 128 are in turn pushed by the combustion products to cause the turbine wheel assembly 124 to rotate; thereby, driving the rotating components of the compressor 114 and/or the fan assembly 112.

Figure 3:
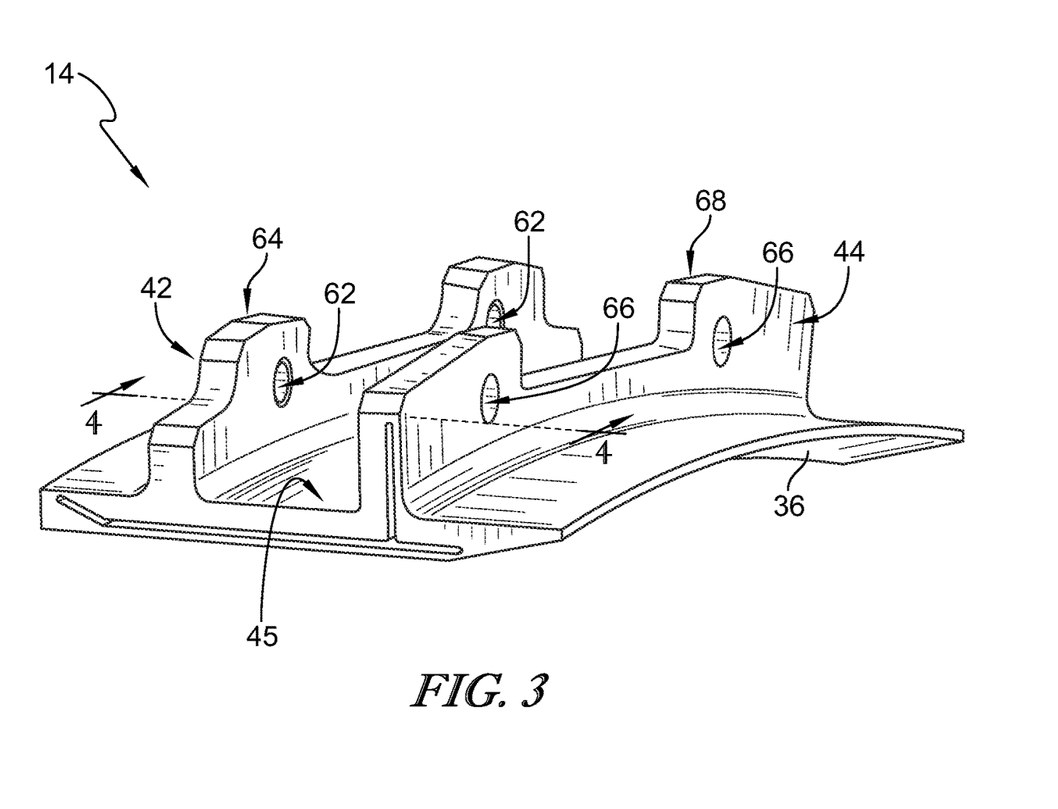
FIG. 3 is a perspective view of the turbine shroud segment of FIG. 2 showing the turbine shroud segment.

The turbine shroud assembly 126 extends around the turbine wheel assembly 124 to block combustion products from passing over the blades 128 without pushing the blades 128 to rotate as suggested in FIG. 2. The turbine shroud assembly 124 is made up of a number of turbine shroud segments 10, one of which is shown in FIG. 3, that extend only partway around the central axis 11 and cooperate to surround the turbine wheel assembly 124. The turbine shroud segments 10 are sealed against one another, such as by strip seal members, to provide a continuous turbine shroud assembly 126. The turbine shroud segments 10 are configured to define the flow path 122 of the gas turbine engine 110. A carrier 12 is configured to support the ceramic shroud segments 14 radially relative to the central axis 11.

Each turbine shroud segment 10 includes a ceramic shroud segment 14, a layer of abradable material 16, and, optionally, a layer of adhesive and/or environmental barrier material 18 as shown in FIG. 4. The ceramic shroud segment 14 is forms the rigid body of the turbine shroud segment 10. The layer of abradable material 16 is configured to provide a flow path surface 36 of the turbine shroud segment 10. The layer of adhesive material 18 engages with the radial inner surface 48 of the ceramic shroud segment 14 and the layer of abradable material 16 to seal the layer of abradable material 16 to the ceramic shroud segment 14. The illustrative layer of abradable material 16 is a material different from the ceramic shroud segment 14 and the layer 18 and is configured to have portions of the layer 16 wear away or rub in to provide a seal between the layer 16 and the turbine blades 128.

The carrier 12 includes a carrier segment 20 and at least one axial pin 22. The pin 22 extends axially into the carrier segment 20 and attachment posts 42, 44 of the ceramic shroud segment 14 to couple the ceramic shroud segment 14 to the carrier segment 20. A fore attachment post 42 is formed to define through holes 62 for receiving pins 22. An aft attachment post 44 is formed to define through holes 66 for receiving the pins 22. The attachment posts 42, 44 extend radially outward from a shroud wall 45 of the turbine shroud segment 10.

Figure 5:
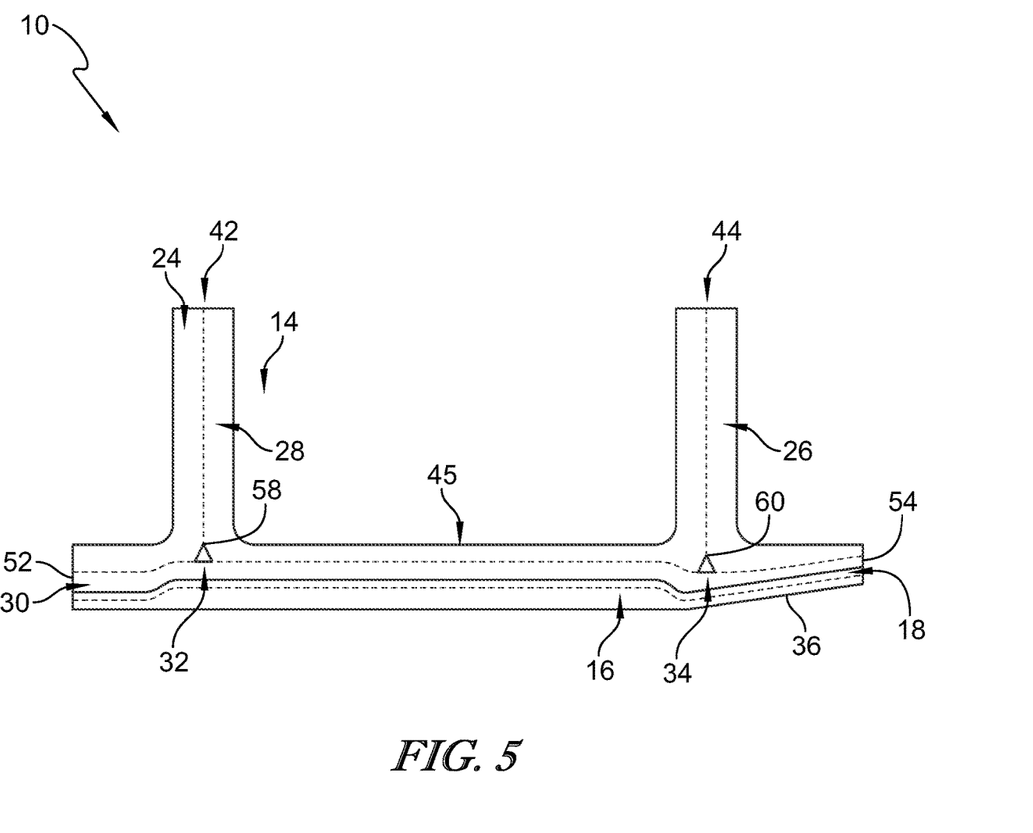
FIG. 5 is a diagrammatic and cross section view of an embodiment of the turbine shroud segment of FIG. 4 showing the ceramic shroud segment includes a plurality of sub-laminates and deltoid shaped fillers, an innermost sub-laminate is shaped to define the channel and the abradable layer fills the channel.
Figure 6:
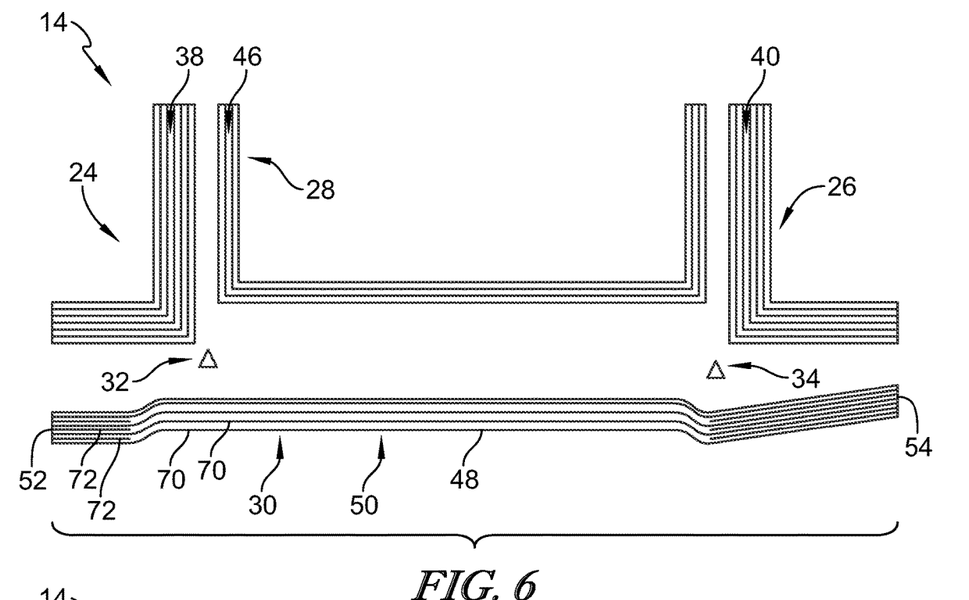
FIG. 6 is a diagrammatic and exploded view of the ceramic shroud segment of FIG. 5 showing the inner sub-laminate includes alternating long and short ceramic plies to help define the channel and the outer sub-laminates each have a number of ceramic plies that cooperate with the shape of the inner sub-laminate to maintain a consistent outer surface of the ceramic shroud segment.
Figure 7:
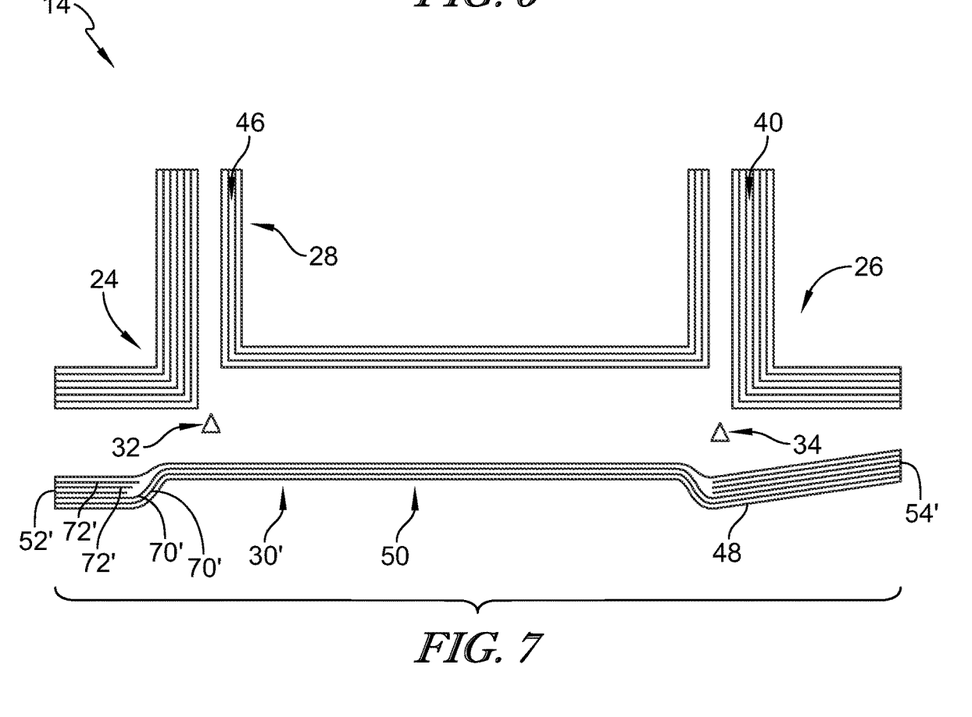
FIG. 7 is diagrammatic and exploded view of another embodiment of the ceramic shroud segment of FIG. 5 showing the inner sub-laminate includes a grouping of short ceramic plies between long plies to help define the channel and the outer sub-laminates each have a number of ceramic plies that cooperate with the shape of the inner sub-laminate to maintain a consistent outer surface of the ceramic shroud segment.

The ceramic shroud segment 14 is made of ceramic matrix composite material in the illustrative embodiment. The ceramic shroud segment 14, as shown in FIGS. 5-7, includes a first ceramic sub-laminate 24, a second ceramic sub-laminate 26, a third ceramic sub-laminate 28, a fourth ceramic sub-laminate 30, a first deltoid 32, and a second deltoid 34. The embodiment of the ceramic shroud segment 14 shown in FIGS. 6 and 7 are substantially similar except where described below and shown in the respective figures. Elements in FIG. 7 that vary as compared to their counterparts in FIG. 6 are denoted with a prime symbol, for example, the fourth sub-laminate 30 in FIG. 6 and the fourth sub-laminate 30' in FIG. 7.

The first ceramic sub-laminate 24, the second ceramic sub-laminate 26, and the third ceramic sub-laminate 28 are substantially similar in the embodiments of FIGS. 6 and 7. Even still, these are illustrative layups for sub-laminates 24, 26, 28 and variations are contemplated.

The fourth ceramic sub-laminate 30 in FIG. 6 is formed using a plurality of full length plies 70 and short plies 72 layered alternately between plies 70. In contrast, the fourth ceramic sub-laminate 30' in FIG. 7 is formed using a plurality of full length plies 70' and short plies 72' in which a stack of multiple short plies 72' are located radially between two full length plies 70'. In other embodiments, the fourth ceramic sub-laminate is formed using a combination of stacked plies 72 and alternating plies 72 with the full length plies 70. The fourth ceramic sub-laminate 30 in FIG. 6 and the fourth sub-laminate 30' in FIG. 7 have substantially similar external dimensions.

The first ceramic sub-laminate 24 is L-shaped and extends axially aft and turns to extend radially outward relative to the central axis 11 as shown in FIGS. 5-7. The second ceramic sub-laminate 26 is spaced apart axially from the first ceramic sub-laminate 24 and is L-shaped to extend axially forward from an aft terminating end and turns to extend radially outward relative to the central axis 11. The third ceramic sub-laminate 28 is U-shaped and located axially between the first ceramic sub-laminate 24 and the second ceramic sub-laminate 26. The fourth ceramic sub-laminate 30 extends axially along the first ceramic sub-laminate 24, the second ceramic sub-laminate 26, and the third ceramic sub-laminate 28.

Figure 8:
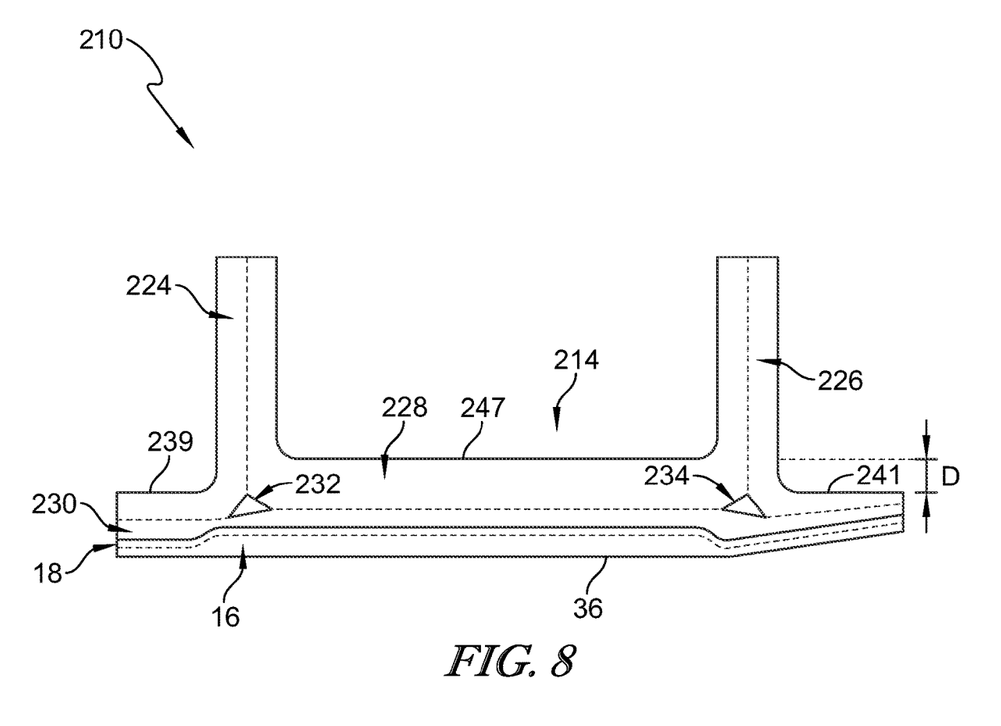
FIG. 8 is a diagrammatic and cross section view of another embodiment of the turbine shroud segment of FIG. 4 showing the ceramic shroud segment includes a plurality of sub-laminates and deltoid shaped fillers, an innermost sub-laminate is shaped to define the channel and the abradable layer fills the channel.

The first deltoid 32 engages with the first ceramic sub-laminate 24, the third ceramic sub-laminate 28, and the fourth ceramic sub-laminate 30 and includes a radially outward extending tip 58. The second deltoid 34 engages with the second ceramic sub-laminate 26, the third ceramic sub-laminate 28, and the fourth ceramic sub-laminate 30 and includes a radially outward extending tip 60. In alternative embodiments, as shown in FIGS. 8-9, the radially outward extending tips 58, 60 of the first deltoid 32 and the second deltoid 34 extend at an angle relative to a ray extending from the central axis 11.

The third ceramic sub-laminate 28 cooperates with the first ceramic sub-laminate 24 and the second ceramic sub-laminate 26 to define the radially extending first attachment post 42 and the radially extending second attachment post 44 which each terminate at free ends 64, 68 respectively, spaced radially apart from the fourth ceramic sub-laminate 30. Referring back to FIG. 3, the radially extending first attachment post 42 is spaced apart axially from the second attachment post 44. The first attachment post 42 and the second attachment post 44 include at least one through hole 62, 64 to receive the pin 22 and couple the ceramic shroud segment 14 to the carrier segment 20.

Referring to FIGS. 5-7, each ceramic sub-laminate 24, 26, and 28 is made of a number of ceramic plies 38, 40, 46. In the embodiments shown in FIGS. 6-7, the first ceramic sub laminate 24 and the second ceramic sub-laminate 26 each have a first number of ceramic plies 38, 40, and the third ceramic sub-laminate 28 has a second number of ceramic plies 46. The second number of ceramic plies 46 is less than the first number of ceramic plies 38, 40, and the ceramic plies 38, 40, and 46 cooperate with the shape of the fourth ceramic sub-laminate 30 to maintain a consistent outer surface of the shroud wall 45 of the ceramic shroud segment 14 (as suggested in FIG. 5).

Figure 9:
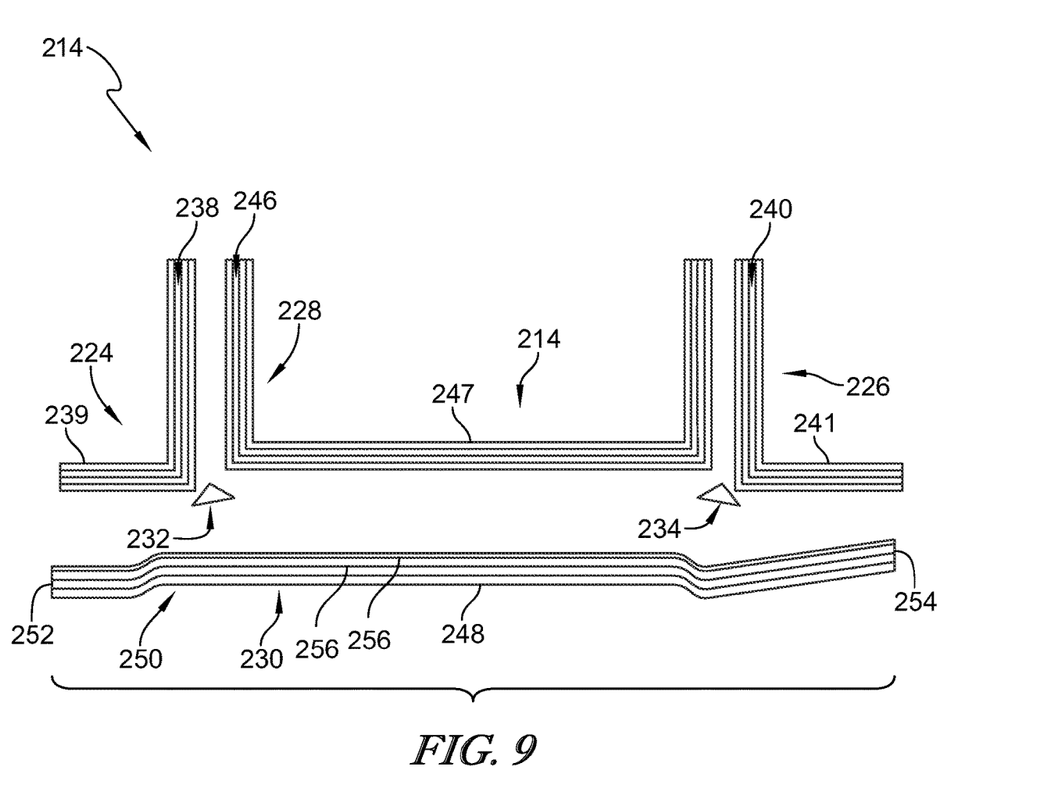
FIG. 9 is a diagrammatic and exploded view of the ceramic shroud segment of FIG. 8 showing the ceramic plies of the inner ceramic sub-laminate extend continuously between axial ends of the inner ceramic sub-laminate and the outer sub-laminates have similar numbers of plies such that the outer surface of the ceramic shroud segment is raised in the midsection of the segment.

In the embodiment shown in FIG. 9, the ceramic sub-laminates 224, 226, and 228 have an equal number of ceramic plies 238, 240, and 246. When engaged with the fourth ceramic sub-laminate 230, an upper surface 247 of the third ceramic sub-laminate 228 is radially outward by a distance D from an upper surface 239 of the first ceramic sub-laminate 224 and an upper surface 241 of the second ceramic sub-laminate 216.

The fourth ceramic sub-laminate 30, 30' is shaped to define the radial inner surface 48 and the circumferentially extending channel 50 that opens radially inwardly as shown in FIGS. 6 and 7. The channel 50 is spaced apart axially from forward axial end 52, 52' and the aft axial end 54, 54' of the fourth ceramic sub-laminate 30, 30'. In FIG. 6, the fourth ceramic sub-laminate 30 includes alternating (in the radial direction) long ceramic plies 70 and short ceramic plies 72 to define the channel 50. In FIG. 7, the fourth ceramic sub-laminate 30' includes a grouping of short ceramic plies 72' radially between long plies 70' to help form the channel 50. In FIG. 9, the fourth ceramic sub-laminate 230 includes a number of ceramic plies 256 which extend continuously between the axial ends 252, 254 of the fourth ceramic sub-laminate 230.

The ceramic sub-laminates 24, 26, 28, 30, 30' are fibrous pre-forms that are pre-assembled and then infiltrated with matrix material and cured to form the ceramic shroud segment 14 as the rigid body for the turbine shroud segment 10. The ceramic shroud segment 14 is illustratively made of a ceramic matrix composite.

The layer of abradable material 16 extends axially along the radial inner surface 48 of the ceramic shroud segment 14 to provide a flow path surface 36 of the turbine shroud segment 10. The layer of abradable material 16 extends along the ceramic shroud segment 14 forward of the channel 50, filling the channel 50, and extending aft of the channel 50.

A second embodiment of the turbine shroud segment 210 is shown in FIGS. 8 and 10. The turbine shroud segment 210 is similar to the turbine shroud segment 10 shown in FIGS. 1-7 and described herein. Accordingly, similar reference numbers in the 200 series indicate features that are common between the turbine shroud segment 210 and the turbine shroud segment 10. The description of the turbine shroud segment 10 is incorporated by reference to apply to the turbine shroud segment 210, except in instances when it conflicts with the specific description and the drawings of the turbine shroud segment 210.

Each turbine shroud segment 210 includes a ceramic shroud segment 214, the layer of abradable material 16, and, optionally, the layer of adhesive and/or environmental barrier material 18 as shown in FIGS. 8 and 9.

The ceramic shroud segment 214 is made of ceramic matrix composite material in the illustrative embodiment. The ceramic shroud segment 214 includes a first ceramic sub-laminate 224, a second ceramic sub-laminate 226, a third ceramic sub-laminate 228, a fourth ceramic sub-laminate 230, a first deltoid 232, and a second deltoid 234. The radially outward extending tips of the first deltoid 232 and the second deltoid 234 extend at an angle relative to a ray extending from the central axis 11 as shown in FIGS. 8 and 9.

The first ceramic sub-laminate 224 is L-shaped and extends axially aft and turns to extend radially outward relative to the central axis 11 as shown in FIGS. 8 and 9. The second ceramic sub-laminate 226 is spaced apart axially from the first ceramic sub-laminate 224 and is L-shaped to extend axially forward from an aft terminating end and turns to extend radially outward relative to the central axis 11. The third ceramic sub-laminate 228 is U-shaped and located axially between the first ceramic sub-laminate 224 and the second ceramic sub-laminate 226. The fourth ceramic sub-laminate 230 extends axially along the first ceramic sub-laminate 224, the second ceramic sub-laminate 226, and the third ceramic sub-laminate 228.

Each ceramic sub-laminate 224, 226, and 228 is made of a number of ceramic plies 238, 240, 246. The ceramic sub-laminates 224, 226, and 228 have an equal number of ceramic plies 238, 240, and 246. When engaged with the fourth ceramic sub-laminate 230, an upper surface 247 of the third ceramic sub-laminate 228 is radially outward by a distance D from an upper surface 239 of the first ceramic sub-laminate 224 and an upper surface 241 of the second ceramic sub-laminate 216.

The fourth ceramic sub-laminate 230 is shaped to define the radial inner surface 248 and the circumferentially extending channel 250 that opens radially inwardly as shown in FIGS. 8 and 9. The channel 250 is spaced apart axially from a forward axial end 252 and an aft axial end 254 of the ceramic shroud segment 214. The fourth ceramic sub-laminate 230 includes only long ceramic plies 256 to define the channel 250. The ceramic plies 256 extend completely between the forward axial end 252 and the aft axial end 254 of the ceramic shroud segment 214.

Illustratively, the fourth ceramic sub-laminate 230 is bent into its shape to define the channel 250 because it includes only full-length plies 70. This results in the upper surface 247 being spaced apart from the surfaces 239, 241. In other embodiments, the ceramic sub-laminates 224, 226, 228 are formed with a number and size of plies so that the surface 247 is at the same radial height as surfaces 239, 241.

A method for manufacturing a turbine shroud segment 10, 210 may include a number of steps. The method may include positioning the L-shaped first ceramic sub-laminate 24, 224 axially apart from an L-shaped second ceramic sub-laminate 26, 226 relative to the axis 11. The U-shaped third ceramic sub-laminate is 28, 228 positioned axially between the first ceramic sub-laminate 24, 224 and the second ceramic sub-laminate 26, 226. The fourth ceramic sub-laminate 30, 30', 230 is positioned along a radial inner side of the first ceramic sub-laminate 24, 224, second ceramic sub-laminate 26, 226, and third ceramic sub-laminate 28, 228 to provide a shroud segment preform. The fourth ceramic sub-laminate 30, 30', 230 formed to define a radially inwardly opening channel 50.

The shroud segment preform is infiltrated to provide the ceramic turbine shroud 14, 214. The layer of abradable material 16, and optionally layer 18, is applied along the radial inner surface 48, 248 of the ceramic turbine shroud 14, 214 such that the layer of abradable material 16 is located forward of the channel 50, fills the channel 50, and is located aft of the channel 50 so as to form a continuous flow path surface 36.

In some embodiments, forming the fourth ceramic sub-laminate 30 includes providing a first ply 70, applying a second ply 72 directly onto the first ply 70, and applying a third ply 72 directly to the second ply 70. The first ply 70 forming the radial innermost surface 48 of the ceramic turbine shroud 14 and extending completely between the first axial end 52 and the second axial end 54 of the ceramic turbine shroud 14. The second ply 72 extending only partway axially from the first axial end 52 toward the second axial end 54. The third ply 70 extending axially completely between the first axial end 52 and the second axial end 54.

In some embodiments, forming the fourth ceramic sub-laminate 30' includes providing a first ply 70', applying a radial stack of a plurality of second plies 72' directly onto the first ply 70', and applying a third ply 72' directly to the stack of second plies 70'. The first ply 70' forming the radial innermost surface 48 of the ceramic turbine shroud 14 and extending completely between the first axial end 52' and the second axial end 54' of the ceramic turbine shroud 14. Each of the second plies 72' extending only partway axially from the first axial end 52' toward the second axial end 54'. The third ply 70' extending axially completely between the first axial end 52' and the second axial end 54'.

In some embodiments, forming the fourth ceramic sub-laminate 214 includes applying a plurality of plies 256 onto one another and bending the fourth ceramic sub-laminate 214 to define the channel 250. Each of the plurality of plies 256 extending axially fully between the first axial end 252 and the second axial end 254.

The present disclosure provides features to minimize the layer of abradable coating on a turbine shroud segment in areas where a turbine wheel blade could rub the abradable coating away. The ceramic shroud segment 14 is formed with a channel 50 that aligns axially with the blades 128 of the turbine wheel such that a relatively thick layer of abradable material 16 is applied in the channel and aligned with the blades 128. The layer of abradable material 16 may be relatively thin fore and aft of the channel 50. The abradable coating could be minimized by forming the ceramic turbine shroud 14 by varying the number of plies in each sub-laminate of the ceramic or ceramic matrix composite shroud segment, reducing the number of plies in one or more sub-laminates, over or under compacting the ceramic or ceramic matrix composite shroud segment, machining away the ceramic or ceramic matrix composite shroud segment, or any combination of the above.

A benefit to the present disclosure may be that a robust abradable coating due is provided to the reduced abradable coating thickness where the shroud is not axially aligned with the blades. Another benefit to the present disclosure may be a reduced cost of producing the ceramic or ceramic matrix composite shroud segment due to the areas with reduced abradable coating thickness.

The present disclosure also provides a ceramic or ceramic matrix composite shroud segment 10 with a constant radial thickness. This could be accomplished by utilizing a varying number of plies within each sub-laminate to form a shape for the ceramic or ceramic matrix composite shroud segment. This could also be accomplished in the tooling by jogging the plies to form the shape for the ceramic or ceramic matrix composite shroud segment. Another way to accomplish this is to jog the forward and aft ends radially inward by the same amount such that the middle portion of the ceramic or ceramic shroud segment is jogged radially outward. This could also be accomplished by utilizing surface layers of variable thickness for the ceramic or ceramic matrix composite shroud segment.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine shroud segment for use in a gas turbine engine, the turbine shroud segment comprising
    a ceramic matrix composite shroud segment that includes:
        an L-shaped first ceramic sub-laminate that extends axially aft and turns to extend radially outward relative to an axis,
        an L-shaped second ceramic sub-laminate that extends axially forward and turns and extends radially outward, the second ceramic sub-laminate spaced apart axially from the first ceramic sub-laminate,
        a U-shaped third ceramic sub-laminate located axially between the first ceramic sub-laminate and the second ceramic sub-laminate, the third ceramic sub-laminate cooperates with the first ceramic sub-laminate and the second ceramic sub-laminate to define a radially extending first attachment post and a radially extending second attachment post of the turbine shroud segment, the first attachment post spaced apart axially from the second attachment post, and
        a fourth ceramic sub-laminate that extends axially along the first ceramic sub-laminate, the second ceramic sub-laminate, and the third ceramic sub-laminate, wherein the fourth ceramic sub-laminate is shaped to define a circumferentially extending channel that opens radially inwardly, the channel being spaced apart axially from axial ends of the fourth ceramic sub-laminate, and a layer of abradable material that extends axially and is located radially inward of a radial inner surface of the ceramic matrix composite shroud segment to provide a flow path surface of the turbine shroud segment, the layer of abradable material extending axially forward of the channel, filling the channel, and extending axially aft of the channel, wherein the fourth ceramic sub-laminate is formed from a plurality of ceramic plies and each of the plurality of ceramic plies included in the fourth ceramic sub-laminate extends continuously and entirely axially between the axial ends of the fourth ceramic sub-laminate.

2. The turbine shroud segment of claim 1, wherein the first ceramic sub-laminate, the second ceramic sub-laminate, and the third ceramic sub-laminate each include a same number of ceramic plies.

3. The turbine shroud segment of claim 1, wherein the third ceramic sub-laminate has a different number of ceramic plies from the first ceramic sub-laminate and the second ceramic sub-laminate.

4. The turbine shroud segment of claim 1, wherein the ceramic matrix composite shroud segment further includes a first deltoid engaged with the first ceramic sub-laminate, the third ceramic sub-laminate, and the fourth ceramic sub-laminate and the first deltoid includes a radially outward extending tip, and the first deltoid is tilted such that the tip extends at an angle relative to a ray extending from the axis.

5. The turbine shroud segment of claim 1, wherein the fourth ceramic sub-laminate tapers radially outward aft of the channel to cause the flow path surface to angle radially outward.

6. The turbine shroud segment of claim 1, wherein the fourth ceramic sub-laminate includes a radially inner most first layer that extends continuously between the axial ends of the fourth ceramic sub-laminate, a second layer directly engaged with the first layer and extending only partway axially between a first of the axial ends and the channel, and a third layer directly engaged with the second layer and extending continuously between the axial ends of the fourth ceramic sub-laminate.

7. The turbine shroud segment of claim 1, wherein the first attachment post extends radially outward in a straight path and terminates at a free end that is spaced apart radially from the fourth ceramic sub-laminate.

8. The turbine shroud segment of claim 7, wherein the first attachment post is formed to define a through hole that extends axially through the first attachment post.

9. The turbine shroud segment of claim 1, further comprising a bond coat layer and an environmental barrier coating layer located radially between the fourth ceramic sub-laminate and the layer of abradable material.

10. A turbine shroud segment for use in a gas turbine engine, the turbine shroud segment comprising
a ceramic shroud segment that includes:
a first ceramic sub-laminate that includes an axially extending first segment and radially extending second segment,
a second ceramic sub-laminate that includes an axially extending first segment and radially extending second segment,
a third ceramic sub-laminate located axially between the first ceramic sub-laminate and the second ceramic sub-laminate, the third ceramic sub-laminate includes an axially extending first segment, a radially extending second segment that extends along the radially extending second segment of the first ceramic sub-laminate to define a first attachment post, and a radially extending third segment that extends along the radially extending second segment of the second ceramic-sub laminate to define a second attachment post, and a fourth ceramic sub-laminate that extends axially along the first ceramic sub-laminate, the second ceramic sub-laminate, and the third ceramic sub-laminate, the fourth ceramic sub-laminate is shaped to define a circumferentially extending channel that opens radially inwardly, the channel being spaced apart axially from axial ends of the fourth ceramic sub-laminate, and a layer of abradable material that extends axially and is located radially inward of a radial inner surface of the ceramic shroud segment to provide a flow path surface of the turbine shroud segment, the layer of abradable material extending forward of the channel, filling the channel, and extending aft of the channel, wherein the fourth ceramic sub-laminate tapers radially outward aft of the channel to cause the flow path surface to angle radially outward.

11. The turbine shroud segment of claim 10, wherein the first ceramic sub-laminate, the second ceramic sub-laminate, and the third ceramic sub-laminate each include a same number of ceramic plies.

12. The turbine shroud segment of claim 10, wherein the third ceramic sub-laminate has a different number of ceramic plies from the first ceramic sub-laminate and the second ceramic sub-laminate.

13. The turbine shroud segment of claim 10, wherein the fourth ceramic sub-laminate includes a radially inner most first layer that extends continuously between the axial ends of the fourth ceramic sub-laminate, a second layer directly engaged with the first layer and extending only partway axially between a first of the axial ends and the channel, and a third layer directly engaged with the second layer and extending continuously between the axial ends of the fourth ceramic sub-laminate.

14. The turbine shroud segment of claim 10, wherein the ceramic shroud segment further includes a first deltoid engaged with the first ceramic sub-laminate, the third ceramic sub-laminate, and the fourth ceramic sub-laminate, the first deltoid including a radially outward extending tip and tilted such that the tip extends at an angle relative to a ray extending from the axis, and a second deltoid engaged with the second ceramic sub-laminate, the third ceramic sub-laminate, and the fourth ceramic sub-laminate, the second deltoid including a radially outward extending tip and tilted such that the tip extends at an angle relative to a second ray extending from the axis.

15. The turbine shroud segment of claim 10, wherein the fourth ceramic sub-laminate is formed from a plurality of ceramic plies and each of the plurality of ceramic plies included in the fourth ceramic sub-laminate extends continuously and entirely axially between the axial ends of the fourth ceramic sub-laminate.

16. A method comprising
positioning an L-shaped first ceramic sub-laminate axially apart from an L-shaped second ceramic sub-laminate relative to an axis, positioning a U-shaped third ceramic sub-laminate axially between the first ceramic sub-laminate and the second ceramic sub-laminate, positioning a fourth ceramic sub-laminate along a radial inner side of the first, second, and third ceramic sub-laminates to provide a shroud segment preform, the fourth ceramic sub-laminate formed to define a radially inwardly opening channel, infiltrating the shroud segment preform to provide a ceramic turbine shroud, and applying a layer of abradable material along a radial inner surface of the ceramic turbine shroud such that the layer of abradable material is located forward of the channel, fills the channel, and aft of the channel so as to form a continuous flow path surface, wherein the fourth ceramic sub-laminate tapers radially outward aft of the channel to cause the flow path surface to angle radially outward.

17. The method of claim 16, further comprising forming the fourth ceramic sub-laminate by providing a first ply, applying a second ply directly onto the first ply, and applying a third ply directly to the second ply, the first ply forming the radial innermost surface of the ceramic turbine shroud and extending completely between a first axial end and a second axial end of the ceramic turbine shroud, the second ply extending only partway axially from the first axial end toward the second axial end, and the third ply extending axially completely between the first axial end and the second axial end.

18. The method of claim 16, further comprising forming the fourth ceramic sub-laminate by applying a plurality of plies onto one another and bending the fourth ceramic sub-laminate to define the channel.

19. The turbine shroud segment of claim 1, wherein the first ceramic sub-laminate, the second ceramic sub-laminate, and the third ceramic sub-laminate cooperate to define a radially-inward edge that varies radially relative to the axis.

20. The turbine shroud segment of claim 4, wherein each deltoid includes three internal angles, and wherein the sum of the three internal angles is 180 degrees.

21. The turbine shroud segment of claim 1, wherein an axially-forward end of the first ceramic sub-laminate has a first radial thickness and an axially-aft end of the second ceramic sub-laminate has a second radial thickness smaller than the first radial thickness.

22. The turbine shroud segment of claim 10, wherein at least a portion of the fourth ceramic sub-laminate is radially outward relative to at least some of both the first ceramic sub-laminate and the second ceramic sub-laminate.

23. The turbine shroud segment of claim 10, wherein the first ceramic sub-laminate, the second ceramic sub-laminate, and the third ceramic sub-laminate cooperate to define a radially-inward edge that varies radially relative to the axis.

* * * * *